US011292608B2

(12) United States Patent
Fox et al.

(10) Patent No.: US 11,292,608 B2
(45) Date of Patent: Apr. 5, 2022

(54) TACTICAL UNMANNED AERIAL VEHICLE (71) Applicant: RPX Technologies, Inc., Stillwater, OK (US)

(72) Inventors: Michael Fox, Stillwater, OK (US); Matthew Dock, Stillwater, OK (US); Jon Stewart, Stillwater, OK (US)

(73) Assignee: RPX Technologies, Inc., Stillwater, OK (US)

( * ) Notice: Subject to any disclaimer, the term of this patent is extended or adjusted under 35 U.S.C. 154(b) by 29 days.

(21) Appl. No.: 17/010,297

(22) Filed: Sep. 2, 2020

(65) Prior Publication Data

US 2020/0398997 A1 Dec. 24, 2020

Related U.S. Application Data (62) Division of application No. 16/274,007, filed on Feb. 12, 2019, now Pat. No. 10,766,633.

(60) Provisional application No. 62/633,818, filed on Feb. 22, 2018, provisional application No. 62/632,844, filed on Feb. 20, 2018, provisional application No. 62/629,456, filed on Feb. 12, 2018.

(51) Int. Cl.
*B64D 45/00* (2006.01)
*B64C 39/02* (2006.01)
*G06K 9/00* (2006.01)
*F41H 13/00* (2006.01)

(52) U.S. Cl.
CPC ........ *B64D 45/0015* (2013.01); *B64C 39/024* (2013.01); *F41H 13/0087* (2013.01); *G06K 9/00221* (2013.01); *B64C 2201/14* (2013.01); *B64D 45/0036* (2019.08)

(58) Field of Classification Search
CPC ............ B64D 45/0015; B64D 45/0036; B64C 39/024; B64C 2201/14; F41H 13/0087; G06K 9/00221
USPC .............................................. 89/1.1; 102/448
See application file for complete search history.

(56) References Cited

U.S. PATENT DOCUMENTS

| | | | | |
|---|---|---|---|---|
| 4,760,793 A | * | 8/1988 | Herring, III | F42B 7/04 102/451 |
| 6,367,388 B1 | * | 4/2002 | Billings | F42B 7/04 102/453 |
| 6,564,687 B2 | * | 5/2003 | Poole | F41H 9/10 42/1.08 |
| 8,171,849 B2 | * | 5/2012 | Amick | F42B 7/043 102/460 |
| 2005/0211125 A1 | * | 9/2005 | Amick | C22C 19/03 102/448 |
| 2009/0114113 A1 | * | 5/2009 | Poore | F42B 7/046 102/460 |
| 2011/0017090 A1 | * | 1/2011 | Menefee, III | F42B 7/02 102/448 |

(Continued)

*Primary Examiner* — Samir Abdosh
(74) *Attorney, Agent, or Firm* — Dunlap Codding, P.C.

(57) ABSTRACT

An unmanned vehicle capable of operating in harsh environments is disclosed. The unmanned vehicle includes an aerial platform, a piloting system supported by the aerial platform, a medium source supported by the aerial platform, and a control system having a processor running computer executable code that actuates the medium source to emit a medium away from the aerial vehicle with an intensity sufficient to disorient a subject when the medium interacts with an exteroceptive sense of a subject.

5 Claims, 5 Drawing Sheets

(56) References Cited

U.S. PATENT DOCUMENTS

| | | | |
|---|---|---|---|
| 2011/0107935 A1* | 5/2011 | Authement, Sr. | F42B 12/40 |
| | | | 102/458 |
| 2011/0231035 A1* | 9/2011 | Houde-Walter | G01S 17/74 |
| | | | 701/2 |
| 2013/0145951 A1* | 6/2013 | Nauman | F42B 7/04 |
| | | | 102/448 |
| 2019/0248507 A1* | 8/2019 | Fox | B64D 45/0015 |

* cited by examiner

TACTICAL UNMANNED AERIAL VEHICLE

INCORPORATION BY REFERENCE

The present patent application is a divisional of U.S. Ser. No. 16/274,007 filed on Feb. 12, 2019, which claims priority to the provisional patent applications identified by U.S. Ser. No. 62/629,456 filed on Feb. 12, 2018, U.S. Ser. No. 62/632,844 filed on Feb. 20, 2018, and U.S. Ser. No. 62/633,818 filed on Feb. 22, 2018, the entire contents of all applications are hereby incorporated by reference.

BACKGROUND

Tactical personnel, such as law enforcement and warfighters, use bright, modulated light to subdue attackers in dark or nighttime situations.

When a strobe light is directed to an aggressor's eyes, the rapid modulation of the light creates a disorienting effect to which it takes time for the brain to adjust. Tactical personnel can use the time an aggressor or aggressors is/are disoriented to their advantage to subdue the aggressor or retreat from a threat. This is often a favorable option because it offers tactical personnel a non-violent way of reacting to a potential threat.

The main effect of a strobe light directed into the eyes of a potential aggressor is that it disorients the potential aggressor giving tactical personnel time to react appropriately. It takes several seconds before the aggressor can adequately adjust to the light which gives tactical personnel time to flee or strike depending on the situation.

Because of the disorienting effect, the subject of the strobe light is far less able to use force. The use of force by an assailant requires coordination and the strobe light will disrupt that ability for several seconds.

The aggressor who has had the strobe light shined in their eyes will suffer from considerably reduced peripheral vision which limits the aggressor's ability to see and respond to events outside of a limited degree of view. This allows tactical personnel a better chance to escape or approach the aggressor with less chance being detected or attacked.

In some tactical situations, tactical personnel would benefit from intelligence gathered from outside of a building, such as a house, prior to taking action. Observation inside a building may be limited by several factors including windows that are high and inaccessible, window coverings, dark rooms, and windows that are too far away to hear sounds from inside the room.

Therefore, there is a need for a surveillance device that is configured to provide information to tactical personnel indicative of activities occurring within the building.

Further, high-temperature survivability is a critical capability when using unmanned vehicles in certain situations such as fire-fighting. However, the construction of most vehicles, such as unmanned aerial vehicles is not ideal for such high-temperature environments. Therefore, a need exists for unmanned vehicles that can perform in high-temperature environments.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Before describing various embodiments of the present disclosure in more detail by way of exemplary descriptions, examples, and results, it is to be understood that the embodiments of the present disclosure are not limited in application to the details of systems, methods, and compositions as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the concepts of the present disclosure, the following terms, unless otherwise indicated, shall be understood to have the following meanings.

The use of the word "a" or "an" when used in conjunction with the term "comprising" in the claims and/or the specification may mean "one," but it is also consistent with the meaning of "one or more," "at least one," and "one or more than one." The use of the term "or" in the claims and/or the specification is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error that exists among the study subjects. Further, in this detailed description, each numerical value (e.g., temperature or time) should be read once as modified by the term "about" (unless already expressly so modified), and then read again as not so modified unless otherwise indicated in context. Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Further, an embodiment having a feature characterized by the range does not have to be achieved for every value in the range, but can be achieved for just a subset of the range. For example, where a range covers units 1-10, the feature specified by the range could be achieved for only units 4-6 in a particular embodiment.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

Figure 1:
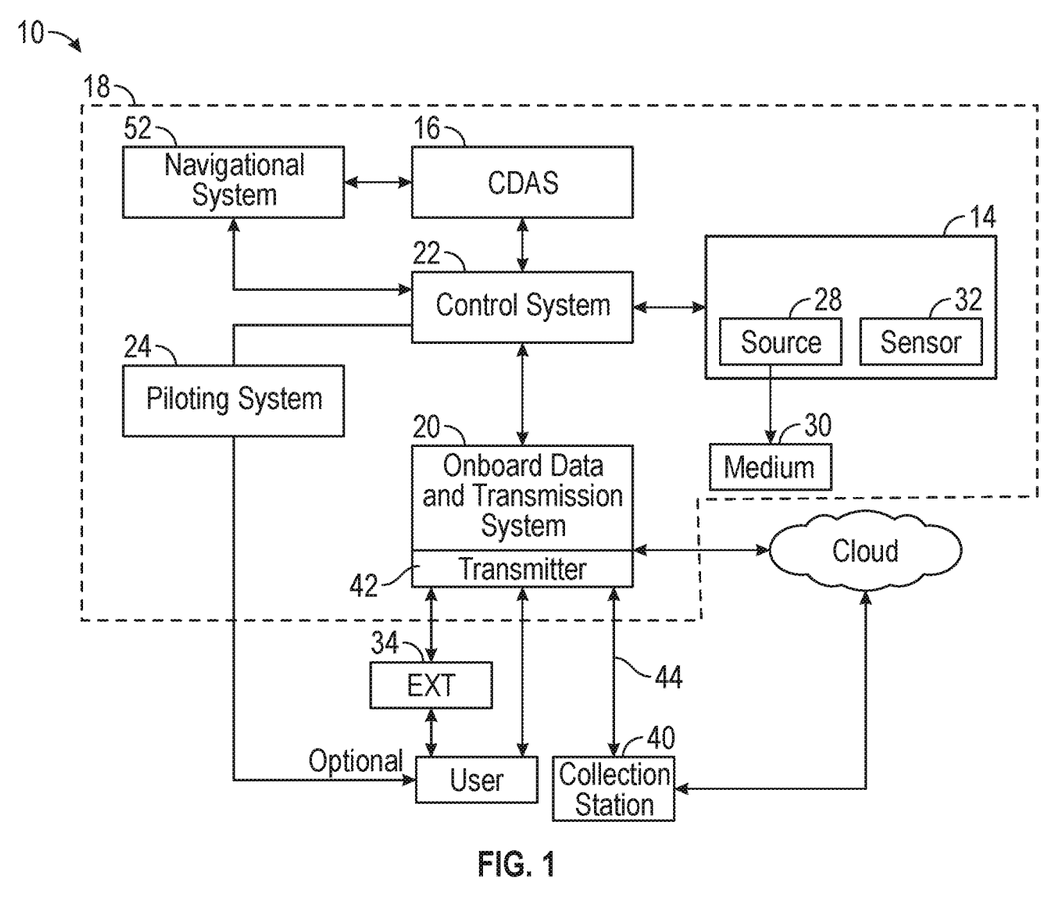
FIG. 1 is a diagrammatic view of an exemplary unmanned vehicle constructed in accordance with one embodiment of the present disclosure.

Referring to the Figures, and in particular to FIG. 1 depicts an exemplary unmanned vehicle 10 for remotely disorienting a subject. The unmanned vehicle 10 supplies a medium to be received by and stimulate at least one exteroceptive sensor of the subject at a level sufficient to temporarily disorient the subject. Exemplary subjects include human or non-human animals. Examples of non-human animals including a dog, a cat, a coyote, a wolf, a mountain lion, or the like.

Exemplary exteroceptive sensors include eyes, nerves involving a sense of touch, ears, tastebuds, and nose. Generally, the unmanned vehicle 10 is configured to provide the medium to the subject without endangering the operator or persons in surrounding environments. The unmanned vehicle 10 may follow a flight path above and/or about the subject at a relatively close distance avoiding obstacles such as a tower, antenna, wire, and/or the like. Additionally, the unmanned vehicle 10 may be configured to output 2D images, or three dimensional or two dimensional files (e.g., CAD files) of the subject for identification, operator monitoring and/or other purposes.

In some embodiments, the unmanned vehicle 10 may comprise a medium source 14, collision detection and avoidance system 16, an aerial platform 18, onboard data processing and transmission system 20, a control system 22, and a piloting system 24. In some embodiments, the unmanned vehicle 10 may further include a distance sensor 25 configured to measure a distance between the aerial platform 18 and the subject. The distance sensor 25 may measure the distance between the aerial platform 18 and the subject when the unmanned vehicle 10 is in use and/or for each period in which the medium source 14 is actuated to produce the medium, for example. Generally, each element of the unmanned vehicle 10 may be used to disorient the subject. For example, using the piloting system 24, a user may pilot the aerial platform 18 via a remote control system 51 (FIG. 2), virtual reality, augmented reality, smartphone (e.g., iPhone), tablet, joystick, and/or the like. In some embodiments, the unmanned vehicle 10 may be piloted autonomously (i.e., user direction may be optional). One or more cameras (e.g., stereoscopic camera, standard camera, 360 degree camera, combinations thereof, or the like) on the aerial platform 18 may present one or more views of the environment to the user. For example, the user may be provided one or more views of a natural environment for positioning and/or moving the aerial platform 18 around the subject. The virtual or augmented reality may allow for the user to observe the subject and/or the environment from the point of view of the aerial platform 18, as if the user is on the aerial platform 18. Additionally, virtual or augmented reality may provide the user additional information about flight and/or operating status of the aerial platform 18. In some embodiments, the user may utilize a radio-frequency control module configured to transmit commands to the aerial platform 18 during flight of the aerial platform 18. The nature of the commands may depend on flying and/or propulsion mechanism in use by the aerial platform 18, including, but not limited to, multiple rotors (e.g., quad or octo-rotor), jet propulsion, a fixed wing with one or more propellers (not shown), or non-fixed wing with multiple rotors 25 which are labeled in FIG. 2 with the reference numerals 26a, 26b, 26c and 26d, or the like. It should be noted that any suitable number of rotors 26 can be provided, such as 4, 6 or 8, for example.

Once the aerial platform 18 is in flight, the medium source 14 may be used to emit the medium to disorient the subject, assist in piloting the aerial platform 18, or illuminate the subject. The medium source 14 may include an optical source 28 capable of projecting electromagnetic energy (e.g., visible light) onto the subject and preferably into the eyes and/or on the face of the subject. The medium source 14 may use other types of mediums, such as sound, thermal energy, or the like, to temporarily disorient the subject. An optical sensor 32 of the medium source 14 may record data of the illumination (i.e., projection of the optical pattern 30) on the subject. The mounting of the optical source 28 and the optical sensor 32 on the aerial platform 18 may provide the rigidity to ensure that the optical source 28 and the optical sensor 32 remain in the same geometrical relationship (i.e., static geometrical relationship) with each other without significant movement during and/or between recording events. Additionally, such mounting may be lightweight to avoid consuming payload capacity of the aerial platform 18.

The data obtained from the optical sensor 32 may be used to locate the subject and direct the piloting system 24 to aim the optical source 28. For example, the control system 22 can be programmed with a facial recognition algorithm to scan one or more image depicting the subject that is generated by the optical sensor 32 to locate the face and/or eyes of the subject within the images. Once the face and/or eyes of the subject is located, the control system 22 would provide suitable instructions to the piloting system 24 to move the position and/or orientation of the aerial platform 18 (and/or a gimbal connected to the aerial platform 18 and the optical sensor 32) to aim the medium generated by the optical source at the face and/or eyes of the subject. Other types of recognition programs can be used depending upon the type of medium to be provided. For example, for sound, the recognition program may look for the subject's head or ears. In some embodiments, the distance between the optical source 28 and the optical sensor 32, angular orientation of the optical source 28 and the optical sensor 32 can be fixed or dynamic. In some embodiments, the optical source 28 may illuminate the subject in a strobed fashion, or with a series of different optical patterns. For example, the colors of the light can be changed to further disorient the subject. During the illumination series, the user may attempt to maintain the aerial platform 18 at a stationary position, or the piloting system may be controlled to follow the subject.

In some embodiments, an optional external optical source 34 may provide additional medium(s) aimed at the subject to disorient the subject. An exemplary external optical source 34 may be a flashlight operated by a police officer. Such scans may provide data on the environment surrounding the subject, to assist in aiming the optical source 28 at the face, head, eyes or ears, of the subject. For example, the control system 22 may be programmed to determine the location of where the additional medium is pointing by using information obtained from the optical sensor 32, and provide control instructions to the piloting system 24. The information from the external optical source 34 can also be used to avoid collisions with the subject and/or interfering objects that may damage, incapacitate and/or destroy the aerial platform 18.

The control system 22 may generally coordinate the operation of the medium source 14, the collision detection and avoidance system 16, the onboard data processing and transmission system 20 and the distance sensor 25. For example, for the medium source 14, the control system 22 may determine the number of strobes per second, illumination time for each strobe, and/or the time at which the optical sensor 32 may sample and/or store the output for further processing and/or transmission. The control system 22 may obtain input from the collision detection and avoidance system 16 and either alert the user when the aerial platform 18 may be at a pre-determined distance to the subject or interfering object, thus allowing the user to decide appropriate action. In some embodiments, the control system 22 may signal the aerial platform 18 to take rapid evasive action independent of the user.

In some embodiments, the onboard data processing and transmission system 20 may perform initial electronic processing in preparation for transmission to a collection station 40. Such processing may include, but is not limited to, data compression, preliminary registration (e.g., compensation for movement of the aerial platform 18 between captures), encapsulation of data in a format used by a transmission link, and/or the like.

In some embodiments, a transmitter 42 (e.g., RF transmitter) of the onboard data processing and transmission system 20 may transmit the processed data to the collection station 40. For example, the transmitter 42 may transmit the processed data to the collection station via a network 44 and/or cloud. Such network 44 may be implemented as the World Wide Web (or Internet), a local area network (LAN), a wide area network (WAN), a metropolitan network, a wireless network, a cellular network, a Global System for Mobile Communications (GSM) network, a code division multiple access (CDMS) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

Location of the collection station 40 may include, but is not limited to, a vehicle, building, or other stationary object, or a second aerial vehicle (e.g., airplane). Within the collection station 40, or within a second location in communication with the collection station 40, a receiver may collect and/or retrieve the processed data sent by the transmitter 42.

Thus, in some embodiments, the optical source 28 may be strobed or modulated between a first state (e.g., on) and a second state having a reduced intensity relative to the first state (e.g., off). The control system 22 may modulate the optical source 28 between 5 and 25 hz. The optical source 28 may be mounted on an unmanned aerial platform 18, which offers some distinct advantages as compared to tactical personnel directly holding the light. Since the aerial platform 18 can be positioned away from tactical personnel, the remotely modulated light would give tactical personnel a relatively safe period to act. The remotely positioned light would also put law enforcement in the peripheral vision of the subject (e.g., aggressor) who's peripheral vision has been desensitized by the strobe thereby giving law enforcement a tactical advantage to take action or not be detected.

The optical source 28 can be any light emitting device that can be rapidly modulated. LED(s) and laser(s) are ideal candidates. These optical sources can be aimed at the face/eyes, which can be accomplished manually by the user sending instructions to the piloting system 24, or automatically using facial recognition algorithms to locate the subject's face/eyes in images obtained by the optical sensor 32. The aerial platform 18 can then accurately aim the strobed light for maximum localized effect while using a minimum beam size.

The control system 22 may use any computational algorithm existing for identification of objects of interest in images collected by the optical sensor 32 and such computation algorithm may be stored in a non-transitory computer readable medium. Generally, the control system 22 may include one or more processors coupled with the non-transitory computer readable medium, and configured to automatically execute this methodology to identify and/or obtain information about objects of interest for a variety of purposes.

The control system 22 may include one or more processors. The term "processor" will include multiple processors unless the term "processor" is limited by a singular term, such as "only one processor". In some embodiments, the processor may be partially or completely network-based or cloud-based. The processor may or may not be located in a single physical location. Additionally, multiple processors may or may not be necessarily located in a single physical location.

The processor may include, but are not limited to, implementation as a variety of different types of systems, such as a digital signal processor (DSP), a central processing unit (CPU), a field programmable gate array (FPGA), a microprocessor, a multi-core processor, a quantum processor, application-specific integrated circuit (ASIC), a graphics processing unit (GPU), a visual processing unit (VPU), combinations thereof, and/or the like.

The processor may be capable of reading and/or executing executable code stored in the one or more non-transitory processor readable medium and/or of creating, manipulating, altering, and/or storing computer data structures into the one or more non-transitory processor readable medium. The non-transitory processor readable medium may be implemented as any type of memory, such as random access memory (RAM), a CD-ROM, a hard drive, a solid state drive, a flash drive, a memory card, a DVD-ROM, a floppy disk, an optical drive, and combinations thereof, for example. The non-transitory readable medium may be located in the same physical location as the processor, or located remotely from the processor and may communicate via a network. The physical location of the non-transitory processor readable medium may be varied, and may be implemented as a "cloud memory", i.e., one or more non-transitory processor readable medium may be partially, or completely based on or accessed via a network.

In some embodiments, the control system 22 may be configured to receive additional data from one or more external sources. In some embodiments, the external source may be user inputted data. In some embodiments, the external source 64 may be data associated with a third party system (e.g., weather, GPS satellite). The information may be provided via a network or input device, including, but not limited to, a keyboard, touchscreen, mouse, trackball, microphone, fingerprint reader, infrared port, slide-out keyboard, flip-out keyboard, call phone, PDA, video game controller, remote control, fax machine, network interface, speech recognition, gesture recognition, eye tracking, brain-computer interface, combinations thereof, and/or the like.

In some embodiments, prior to movement of the aerial platform 18, a user may provide the control system 22 with some or all parameters to aid the CDAS system 16 in navigation. Parameters may include, but are not limited to, information identifying the subject, suggested flight path, estimated height of subject. The CDAS system 16 may include AI software configured to navigate the aerial platform 18 based on parameters, received data from environment mapping, extracted data from scanning data processed onboard or provided via network from a user, and/or the like.

The aerial platform 18 may be configured to support and move the medium source 14, CDAS 16, onboard processing and transmission system 20, control system 22, and piloting system 24 within the air. Generally, the aerial platform 18 may be configured to move at a predetermined low speed (e.g., 1 km/h). Additionally, the aerial platform 18 may be configured to hover (i.e., remain stationary) within the air. For example, the aerial platform 18 may be configured to move at a low speed or hover as the optical source 28 is aimed at the subject or the optical sensor 32 obtains sensor data of the subject. The aerial platform 18 may also include load capacity permitting unimpeded aerial navigation while transporting the medium source 14 and CAS 16. Further, the aerial platform 18 may be configured to carry fuel to sustain long periods of flight (e.g., 2 hours) prior to refueling to minimize time to complete a scanning process for the structure 12.

Figure 2:
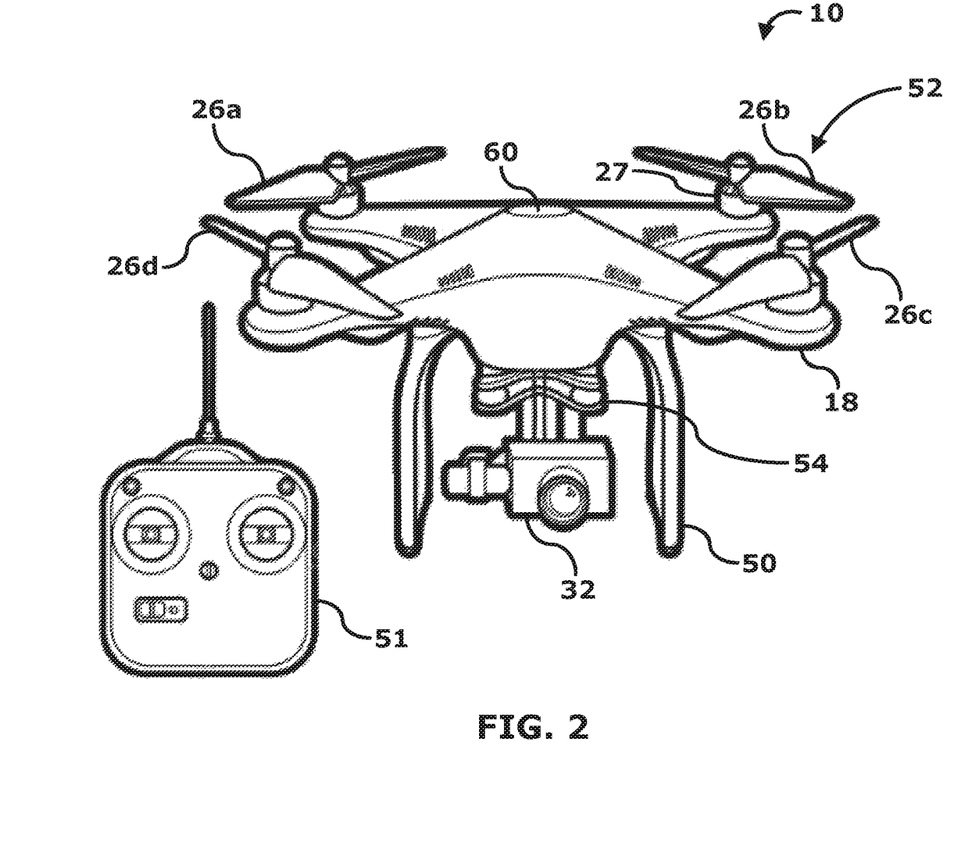
FIG. 2 is a perspective of one embodiment of the unmanned vehicle of FIG. 1 constructed in accordance with one embodiment of the present disclosure.

Generally, the aerial platform 18 may include one or more mechanical platforms, one or more propulsion systems, and one or more mounting systems. The piloting system 24 may aid in providing direction to the one or more propulsion systems 52 or the mounting system 54. In some embodiments, the mounting system 54 may be connected between the optical sensor 32 and the mechanical platform 50 such that the mechanical platform 50 prevents the optical sensor 32 from hitting the ground when the aerial platform 18 lands. In some embodiments, the mounting system 54 may include a gimbal for moving the optical sensor 32 relative to the mechanical platform 50.

In some embodiments, the propulsion system 52 may include two or more rotors 26 (e.g., helicopter, quadcopter, octocopter). In some embodiments, the four or more rotors 26 may be attached to electric motors 27 (only one of which is numbered in FIG. 2) for rotating the rotors 26. In some embodiments, relative rotational velocity of the four or more rotors 26 may be configured to control direction and/or speed of flight of the aerial platform 18. By controlling the relative rotational velocity of the four or more rotors 26, the aerial platform 18 may obtain slow and/or stationary flight (i.e., hovering), and may operate for extended periods of time. The aerial platform 18 may include other configurations of the propulsion system 52 configured to utilize different placement and/or propulsion providing slow and/or stationary flight.

In some embodiments, the aerial platform 18 may include one or more power sources (not shown). The power sources may include one or more supplies of power to at least one or more electric loads on the aerial platform 18. The one or more power sources may include, but are not limited to electrical, solar, mechanical, or chemical energy. For example, in some embodiments, fuel may be used to power one or more components of the aerial platform 18. Additionally, one or more batteries may be included as one or more power sources for the aerial platform 18.

In some embodiments, a diameter of the medium generated by the medium source 14 can be automatically adjusted to a minimum effective size relative to the size which is proportionate to the size of the face and distance from the light source.

In some embodiments, the disorientation system may be provided with two or more medium sources 14. For example, one of the medium sources 14 can be used to provide a modulated light source, and another one of the medium sources 14 may be used to generate a colocated sound to further draw attention to the aerial platform 18 and further disorient the subject.

The control system 22 of the aerial platform 18 may be programmed to provide instructions to the piloting system 24 in a way that moves the aerial platform 18 to offer a tactical advantage. One such movement would be in a direction that draws attention progressively away from the tactical team. Another pattern would be for the aerial platform to automatically move to a position furthest from the tactical team thereby drawing attention away from the team.

In some embodiments, coordinated strobe patterns from multiple aerial platforms could give the illusion of movement and further confuse the subject.

In use, the aerial platform 18 is piloted near a subject, and the medium source 14 is aimed at the subject and actuated as discussed above. In some embodiments, the medium source 14 can be actuated to generate the medium prior to aiming the medium source 14 at the subject.

High-temperature survivability is a critical capability when using unmanned vehicles in certain situations such as fire-fighting. However, the construction of most previous vehicles, such as unmanned aerial vehicles is not ideal for such high-temperature environments. To improve the survivability of these vehicles, several inventive approaches can be taken as described below.

First, in an exemplary embodiment the mechanical platform 50 includes a housing 60 surrounding electronics and other components forming the avoidance system 16, the transmission system 20, the control system 22, the piloting system 24, and the transmitter 42. Components of these systems which should be exposed to the environment around the housing, such as certain types of sensors, may be provided through an opening in the housing 60. As explained in more detail below, the unmanned vehicle 10 includes a temperature buffer 70 around the electronics. The temperature buffer 70 (FIG. 3) is configured to protect the electronics from temperatures outside of the housing 60 above maximum thermal operating characteristics of the electronics. The temperature buffer 70 can be constructed of a material configured to reflect electromagnetic wavelengths in a range of 500 um to 2 um, an insulating material, a cooling material, a phase change material and combinations thereof.

Figure 3:
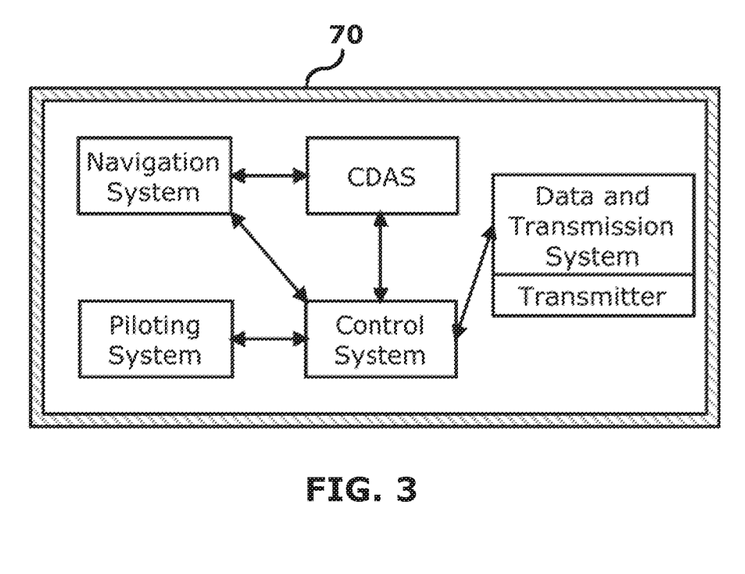
FIG. 3 is a diagrammatic view of an electrical system of the unmanned vehicle of FIG. 1 surrounded by a thermal barrier in accordance with one embodiment of the present disclosure.

In use, the unmanned vehicle 10 may be exposed to fire and is subjected to significant radiative heat transfer. The radiative heat transfer can be minimized by covering the vehicle's components, including the housing 60 with IR-reflective materials that reflect wavelengths in the 500 um to 2 um range. One applicable covering or construction material is aluminum. This material can be applied directly to the underlying structure, such as the housing 60 or can be stood off slightly to act as a radiative heat shield.

A second approach to reducing temperature rise in the unmanned vehicle 10 is to incorporate phase change materials (PCM) into the construction of the unmanned vehicle 10. Initially, solid-liquid PCMs behave like sensible heat storage (SHS) materials. The temperature of the phase change material rises as the phase change material absorbs heat. When PCMs reach the temperature at which they change phase (the PCM's melting temperature) the PCM absorb large amounts of heat and remain at an almost constant temperature. The PCM continues to absorb heat without a significant rise in temperature until all the PCM is transformed to the liquid phase. Long chain paraffin wax is one such material that changes phase at moderate temperatures and could be used to absorb heat. Another alternative is water. Liquid water stored in the mechanical platform 50 must be boiled before the surrounding structure temperature can rise above 100 C which is still cool enough to protect most electronics, including integrated circuitry. Thus, temperature sensitive components of the unmanned vehicle 10, such as electronics within the avoidance system 16, the transmission system 20, the control system 22, the piloting system 24, the transmitter 42, and any motor(s) driving the rotors 26 can be surrounded by a container containing the PCM. Ice is another example of a phase change material in which the ice transforming from solid to liquid is an option. Further, another material, such as chilled water or an anti-freeze liquid can be passed across the ice and throughout sensitive components of the unmanned vehicle 10. The container can be designed to have an inlet or outlet, so that the PCM can be removable and replaced with fresh PCM. In some embodiments, this can be accomplished by implementing the container holding the PCM as a replaceable cartridge. The time it takes to transform all of the PCM adds to a safe operating time that the unmanned vehicle 10 can be exposed to extreme heat. Once all of the PCM material has changed phase, it must be "regenerated" by waiting for the PCM to cool. Alternately onboard water could be sprayed onto sensitive components for cooling or atomized water could be delivered to external vehicle components to take advantage of evaporative cooling. Water can also be stored in the vehicle in a frozen state which then requires a great deal of energy absorption to transition the material through two phase changes prior to the protected structures exceeding 100 degrees C.

Sensitive components may also be insulated with a suitable insulating material, such as an aerogel which offers tremendous insulating properties with minimal weight. Aerogel typically has a density between 0.0011 to 0.5 g cm-3, with a typical average of around 0.020 g cm-3. This means that aerogel is usually only 15 times heavier than air, and has been produced at a density of only 3 times that of air. A typical silica aerogel has a total thermal conductivity of ~0.017 W/mK. Temperature sensitive components of the unmanned vehicle 10, such as electronics within the avoidance system 16, the transmission system 20, the control system 22, the piloting system 24, the transmitter 42, and any motor(s) driving the rotors 26 (especially those that generate little heat) can survive longer in hot environments when protected with such materials.

The temperature of the rotors 26, being thin and lightweight, is also considered when maximizing vehicle operating longevity at high temperatures. Unmitigated, the rotor temperature will quickly reach ambient temperatures due to the thin, lightweight structure and enhanced convective heat transfer resulting from the rotor's velocity through the air. The rotors 26 can be constructed from heat resistant materials such as graphene, graphite, or carbon nanotubes (i.e. Miralon). Another approach to cooling the rotor 26 is by pumping a cool, or liquid phase changing material through one or more blade(s) of the rotors 26 in flight. In some embodiments, this can be accomplished by passing cooled air (e.g. air passed across the PCM) through passages in the rotors 26.

The optical sensor 32, such as a thermal camera and other electronics, may also be sensitive to heat. In this case, heat levels elevated above an operating temperature range of the optical sensor 32 affects the optical sensor's ability to function and generate high-quality images. These components can be cooled with a liquid or gas. For example, these components can be cooled with water from an onboard ice bath which increases the performance of the optical sensor 32. The optical sensor 32 may be configured to detect and form images of energy in a longwave infrared having a wavelength between 6 um to 12 um. The optical sensor 32 may be cooled by the phase change material, such as water. Printed circuit boards and their associated components can be cooled by a similar means. Internal cavities can be used to carry cooled liquid inside the printed circuit board thereby cooling the board and key components. In some embodiments, the unmanned vehicle 10 may include an atomizer (not shown) on the mechanical platform 50, and a fluid delivery system (not shown) connected to the atomizer and configured to supply a fluid to the atomizer, whereby atomized fluid can be released outside of the mechanical platform 50 during flight of the aerial platform 18 to create a cooler operating environment.

Figure 4:
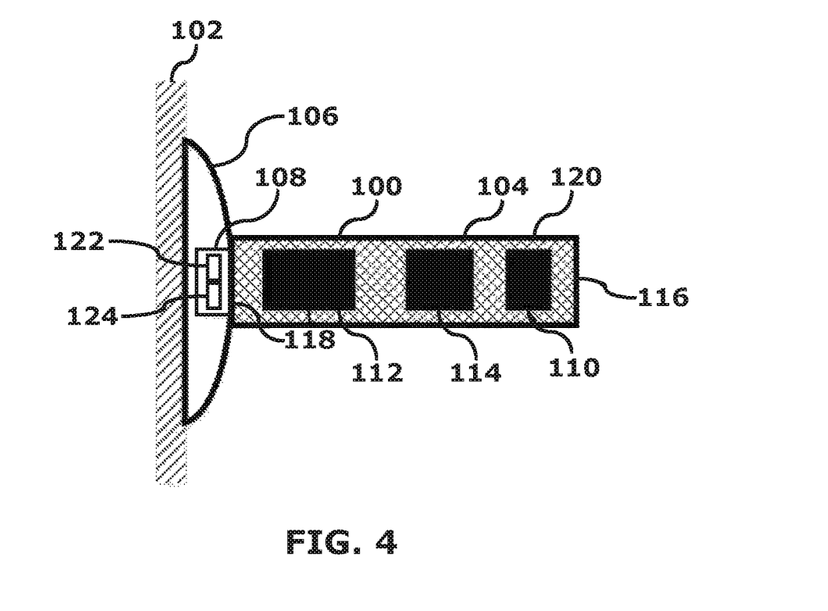
FIG. 4 is a diagrammatic view of a surveillance device constructed in accordance with one embodiment of the present disclosure.

Referring now to FIG. 4, a surveillance device 100 for performing surveillance through a material 102 (e.g., window, wall, or the like) that may be delivered and/or part of an unmanned aerial vehicle such as unmanned vehicle 10 is described. In general, the surveillance device 100 may be provided with a portable housing 104, a mounting assembly 106 (such as a suction cup), accessory package 108, a wireless transceiver 110, a power supply 112, and electronics 114 configured to control the surveillance device 100. The portable housing 104 has a rear face 116, a front face 118, and a peripheral side wall 120 formed therebetween. The mounting assembly 106 is connected to the housing 104 and extends from the front face 118 of the housing 104. The mounting assembly 106 is configured to connect the housing 104 to the material 102 in a predetermined orientation. The accessory package 108 may be provided with a controller 122 and at least one illumination device 124 to selectively emit a predetermined light spectrum in an emission path.

The predetermined orientation and the emission path are selected such that the emission path passes through the material 102 upon connecting the housing 104 to the material 102 in the predetermined orientation. The wireless transceiver 110 is coupled to the accessory package 108, and is configured to receive wireless instructions and pass the wireless instructions to the controller 122 of the accessory package 108. The first wireless instruction instructing the controller 122 to actuate the illumination device 124. The power supply 112 is mounted in the housing 104 and is configured to supply electrical power. The power supply leads are constructed of a conductive material, and connected to terminals on the power supply 112. The power supply leads are connected to the accessory package 108 and the wireless transceiver 110 whereby power applied to the power supply leads is supplied to the controller 122, the at least one emission device 124 and the wireless transceiver 110.

In some embodiments, the portable housing 104 is in the form of a dart having a shape that reduces drag from air moving past the portable housing 104. In other embodiments, the portable housing 104 is in the form of a drone body. The material 102 can be a window, and the predetermined light spectrum includes light that is visible to a human. The mounting assembly 106 may be, but is not limited to, a suction cup, an adhesive strip, tape, glue, or other tacky substances, for example.

Examples of accessories that could be include in the accessory package 108 include:
Microphones—including various types such as contact microphones having a probe to contact the material (window or wall); a laser microphone that uses a laser beam to sense vibration within the material; or an acoustic microphone that uses a sensor to detect vibrations passing within air.
Cameras (may include artificial intelligence/image recognition to sense and identify movements). The cameras may also be configured to receive and interpret mediums other than visible light, such as an infrared portion or millimeter band electromagnetic waves of the electromagnetic spectrum.
Motion detectors.
Lights (visible, non-visible, etc.).
Transmitters to transmit sensor data.
Receivers to remotely actuate lights or other accessories.

Delivery of the window mountable accessories can be via:
Long range dart launched via a mechanical mechanism (i.e., a gun, 12 gauge round from a shotgun, e.g., Remington brand model 870, with a reduced charge sufficient to connect the dart to the window without breaking the window).
Dart launched by unmanned vehicle 10 using any sufficient propulsion system, such as spring, pneumatic or the like.
Dart placed via immediate proximity by unmanned vehicle 10.
Accessory mounted by hand.

The accessory package 108 sensors transmit at least one of imagery and sound via a wireless connection to law enforcement. The accessory package 108 may also be configured to recognize movement and transmit audio alarms to law enforcement.

One or more light may be remotely controlled in some configurations. When light(s) are used, it is beneficial for the back side (facing away from the material 102) to be black to block light illuminating the opposite direction.

Figure 5:
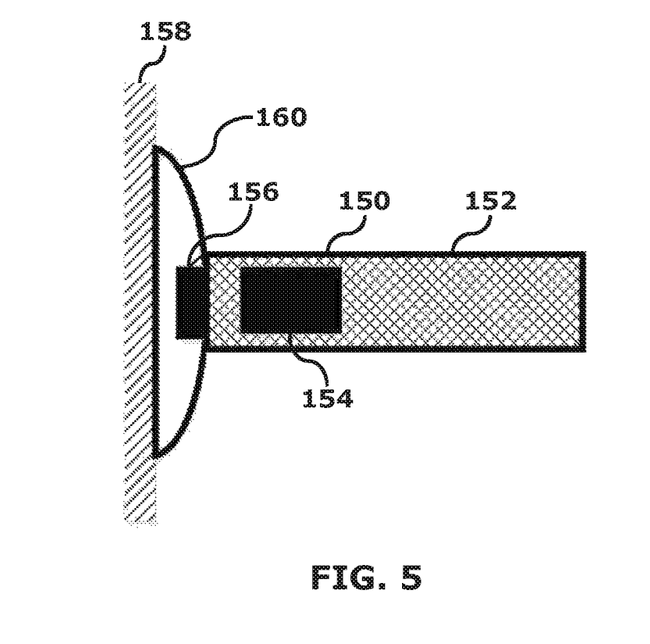
FIG. 5 is a diagrammatic view of another surveillance device constructed in accordance with one embodiment of the present disclosure.

FIG. 5 illustrates an embodiment of a surveillance device 150 formed as a dart 152 having a battery 154 powering a light source 156. The surveillance device 150 may be attached to a material 158 via an attachment device 160 such as a suction cup. In such an embodiment, the light source 156 of the surveillance device 150 may be automatically triggered when the dart 152 is fired from an unmanned aerial vehicle, for instance, such that when the surveillance device 150 attaches to the material 158 the light source 156 shines through the material 158 to illuminate a building, for instance.

Figure 6:
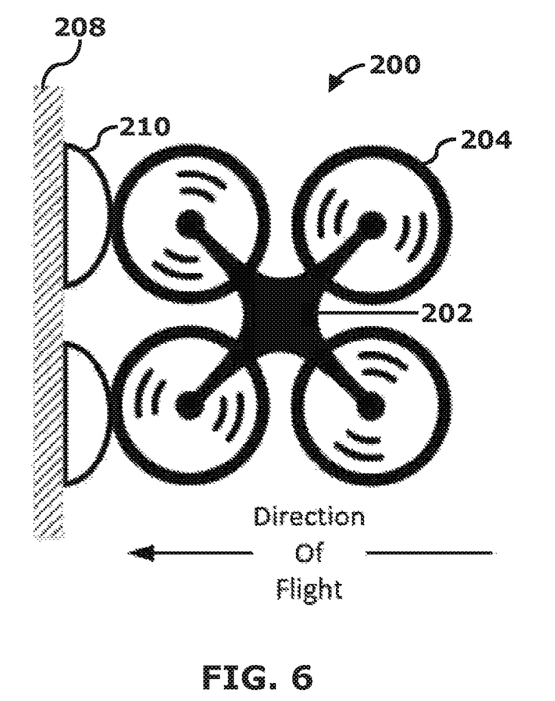
FIG. 6 is an illustration of another surveillance device constructed in accordance with one embodiment of the present disclosure.
Figure 7:
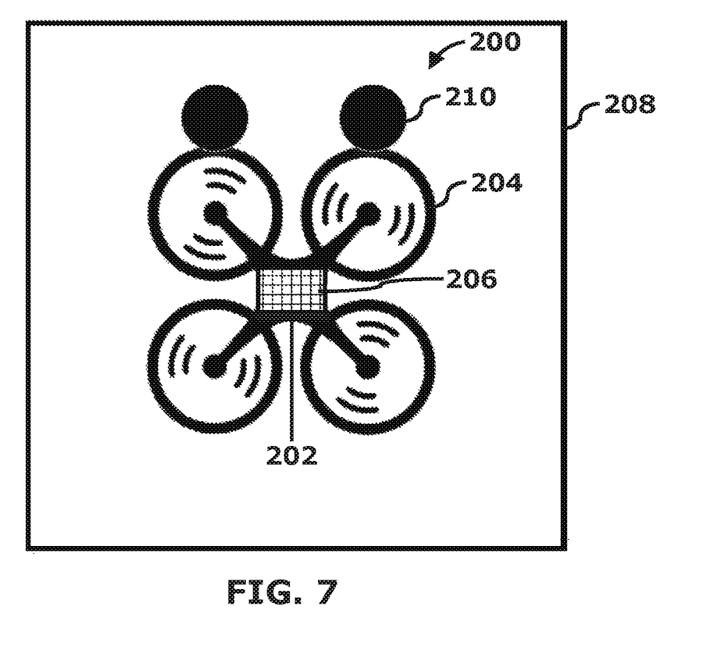
FIG. 7 is an illustration of the surveillance device of FIG. 6 in a mounted position in accordance with one embodiment of the present disclosure.

In another embodiment illustrated in FIGS. 6 and 7, a surveillance device 200 is provided with a portable housing 202 can be in the form of an unmanned aerial vehicle 204. In such an embodiment, an accessory package 206, a wireless transceiver, a power supply, and a controller are carried by the portable housing 202. In this embodiment, the unmanned aerial vehicle 204 is designed to be flown to a material 208 (e.g., a window), and to connect a mounting assembly 210 (only one of which is marked in FIGS. 6 and 7, respectively) to the material 208 instead of landing. Then, motors on the unmanned aerial vehicle 204 providing power to propellers are de-actuated so that the unmanned aerial vehicle 204 body pivots down onto the material 208 whereby illumination source(s) of the accessory package 206 can be actuated so that the emission path is directed through the material 208, for example.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A surveillance device for performing surveillance through a material transparent to a predetermined light spectrum, the surveillance device comprising:
    a portable housing having a rear face, a front face and a peripheral side wall formed therebetween;
    a mounting assembly connected to the housing and extending from the front face of the housing, the mounting assembly configured to connect the housing to the material in a predetermined orientation;
    an accessory package comprising a controller, and at least one emission device to selectively emit a predetermined light spectrum in an emission path, the predetermined orientation and the emission path being selected such that the emission path passes through the material upon connecting the housing to the material in the predetermined orientation;
    a wireless transceiver coupled to the accessory package, and configured to receive wireless instructions, and pass the wireless instructions to the controller of the accessory package, a first wireless instruction instructing the controller to actuate the emission device; and
    a power supply bay in the portable housing; and
    power supply leads constructed of a conductive material, and connected to terminals within the power supply bay, the power supply leads connected to the accessory package and the wireless transceiver whereby power applied to the power supply leads is supplied to the controller, the at least one emission device and the wireless transceiver.

2. The surveillance device of claim 1, wherein the portable housing is in the form of a dart having a shape that reduces drag from air moving past the portable housing.

3. The surveillance device of claim 1, wherein the portable housing is in the form of a drone body.

4. The surveillance device of claim 1, wherein the material is a window, the predetermined light spectrum includes light that is visible to a human.

5. The surveillance device of claim 1, wherein the mounting assembly is a suction cup.

* * * * *

UNITED STATES PATENT AND TRADEMARK OFFICE
CERTIFICATE OF CORRECTION

PATENT NO. : 11,292,608 B2
APPLICATION NO. : 17/010297
DATED : April 5, 2022
INVENTOR(S) : Michael Fox, Matthew Dock and Jon Stewart It is certified that error appears in the above-identified patent and that said Letters Patent is hereby corrected as shown below:

In the Specification
Column 8, Line 19: Delete "CAS 16." and replace with -- CDAS 16. --

In the Claims
Column 13, Line 11: Claim 1 Before "housing" insert -- portable --
Column 13, Line 12: Claim 1 Before "housing," insert -- portable --
Column 13, Line 13: Claim 1 Before "housing" insert -- portable --
Column 13, Line 20: Claim 1 Before "housing" insert -- portable --

Signed and Sealed this
Twenty-second Day of November, 2022

Katherine Kelly Vidal
*Director of the United States Patent and Trademark Office*